United States Patent
Bharathi Somashekar et al.

(10) Patent No.: US 12,127,001 B2
(45) Date of Patent: Oct. 22, 2024

(54) TERMINATION OF CONNECTIONS OVER A FORWARDING INTERFACE BETWEEN NETWORKS

(71) Applicant: Nokia Technologies Oy, Espoo (FI)

(72) Inventors: Rekha Bharathi Somashekar, Bangalore (IN); Sreejesh Sreekumar, Bangalore (IN); Diwakar Jois, Bangalore (IN); Minisha Das, Bangalore (IN); Bruno Landais, Pleumeur-Bodou (FR); Anja Jerichow, Grafing bei München (DE)

(73) Assignee: Nokia Technologies Oy, Espoo (FI)

( * ) Notice: Subject to any disclaimer, the term of this patent is extended or adjusted under 35 U.S.C. 154(b) by 333 days.

(21) Appl. No.: 17/586,297

(22) Filed: Jan. 27, 2022

(65) Prior Publication Data

US 2022/0248229 A1    Aug. 4, 2022

(30) Foreign Application Priority Data

Feb. 1, 2021  (FI) ...................................... 20215108

(51) Int. Cl.
*H04L 9/40*    (2022.01)
*H04W 8/12*    (2009.01)
(Continued)

(52) U.S. Cl.
CPC ......... *H04W 12/102* (2021.01); *H04L 63/166* (2013.01); *H04L 63/205* (2013.01);
(Continued)

(58) Field of Classification Search
CPC . H04W 12/37; H04W 12/102; H04W 84/042; H04L 63/0281; H04L 63/166; H04L 63/205; H04L 67/143
See application file for complete search history.

(56) References Cited

U.S. PATENT DOCUMENTS 10,834,571 B1    11/2020  Yau et al.
11,076,281 B1 *   7/2021  Yau ........................ H04W 8/12
(Continued)

FOREIGN PATENT DOCUMENTS

| WO | 2019/215390 A1 | 11/2019 |
| WO | 2020/094547 A1 | 5/2020 |
| WO | 2020/174121 A1 | 9/2020 |

OTHER PUBLICATIONS

"3GPP TS 29.573 version 16.4.0 (Release 16)" [Online], Nov. 2020 [Retrieved on: Feb. 18, 2024], www.etsi.org, Retrieved from: <https://etsi.org/deliver/etsi_ts/129500_129599/129573/16.04.00_60/ts_129573v160400p.pdf > (Year: 2020).*

(Continued)

*Primary Examiner* — Eric W Shepperd
(74) *Attorney, Agent, or Firm* — Duft & Bornsen, PC

(57) ABSTRACT

There is provided an apparatus configured to protect security of communication in roaming scenarios between a first network and a second network, the apparatus being a first apparatus residing in the first network and comprising means for in response to a selection of transport layer security as a security capability mechanism, transmitting, to a second apparatus residing in the second network and configured to protect security of communication in roaming scenarios between the first network and the second network, a request to terminate connections over a forwarding interface between the first apparatus and the second apparatus.

20 Claims, 9 Drawing Sheets

(51) Int. Cl.
  *H04W 12/102* (2021.01)
  *H04W 12/37* (2021.01)
  *H04W 84/04* (2009.01)

(52) U.S. Cl.
  CPC .............. *H04W 8/12* (2013.01); *H04W 12/37*
  (2021.01); *H04W 84/042* (2013.01)

(56) References Cited

U.S. PATENT DOCUMENTS

| | | | | |
|---|---|---|---|---|
| 2008/0109650 | A1* | 5/2008 | Shim | H04L 63/166 |
| | | | | 713/151 |
| 2014/0068707 | A1* | 3/2014 | Sakura | H04L 63/20 |
| | | | | 726/1 |
| 2018/0241775 | A1* | 8/2018 | Vera-Schockner | |
| | | | | H04L 63/0428 |
| 2018/0278580 | A1* | 9/2018 | Raman | H04L 67/141 |
| 2020/0007321 | A1* | 1/2020 | Doliwa | H04L 9/14 |
| 2020/0236114 | A1* | 7/2020 | Patil | H04L 63/0823 |
| 2022/0030413 | A1* | 1/2022 | Ben Henda | H04L 63/0823 |
| 2022/0104020 | A1* | 3/2022 | Rajput | H04W 12/10 |
| 2022/0104112 | A1* | 3/2022 | Rajput | H04L 67/56 |

OTHER PUBLICATIONS

Extended European Search Report received for corresponding European Patent Application No. 22153809.3, dated Jun. 9, 2022, 8 pages.

"3rd Generation Partnership Project; Technical Specification Group Services and System Aspects; Security architecture and procedures for 5G system (Release 16)", 3GPP TS 33.501, V16.4.0, Sep. 2020, pp. 1-250.

"3rd Generation Partnership Project; Technical Specification Group Core Network and Terminals; 5G System; Public Land Mobile Network (PLMN) Interconnection; Stage 3 (Release 16)", 3GPP TS 29.573, V16.4.0, Sep. 2020, pp. 1-95.

Office action received for corresponding Finnish U.S. Appl. No. 20/215,108, dated Jun. 22, 2021, 6 pages.

Office action received for corresponding Finnish U.S. Appl. No. 20/215,108, dated Nov. 23, 2021, 5 pages.

* cited by examiner

TERMINATION OF CONNECTIONS OVER A FORWARDING INTERFACE BETWEEN NETWORKS

FIELD

Various example embodiments relate to communication between networks, e.g. inter public land mobile network (PLMN) communication.

BACKGROUND

Roaming refers to a user device, e.g. mobile phone, being used outside the range of a home network and connecting to a visited network. Security in roaming scenarios may be a serious concern for mobile network operators and their customers. For example, in Fifth Generation (5G) networks, a security edge protection proxy, SEPP, may be used to protect communication between the home network and the visited network.

A situation may arise, wherein a certain connectivity and message exchanges may need to be terminated between the home and visited networks.

SUMMARY

According to some aspects, there is provided the subject-matter of the independent claims. Some example embodiments are defined in the dependent claims. The scope of protection sought for various example embodiments is set out by the independent claims. The example embodiments and features, if any, described in this specification that do not fall under the scope of the independent claims are to be interpreted as examples useful for understanding various example embodiments.

According to a first aspect, there is provided an apparatus configured to protect security of communication in roaming scenarios between a first network and a second network, the apparatus being a first apparatus residing in the first network and comprising means for in response to a selection of transport layer security as a security capability mechanism, transmitting, to a second apparatus residing in the second network and configured to protect security of communication in roaming scenarios between the first network and the second network, a request to terminate connections over a forwarding interface between the first apparatus and the second apparatus.

According to a second aspect, there is provided an apparatus configured to protect security of communication in roaming scenarios between a first network and a second network, the apparatus being a second apparatus residing in the second network and comprising means for in response to a selection of transport layer security as a security capability mechanism, receiving from a first apparatus residing in the first network and configured to protect security of communication in roaming scenarios between the first network and the second network, a request to terminate connections over a forwarding interface between the first apparatus and the second apparatus.

According to a third aspect, there is provided a method comprising, in response to a selection of transport layer security as a security capability mechanism, transmitting, by an apparatus configured to protect security of communication in roaming scenarios between a first network and a second network, the apparatus being a first apparatus residing in the first network, to a second apparatus residing in the second network and configured to protect security of communication in roaming scenarios between the first network and the second network, a request to terminate connections over a forwarding interface between the first apparatus and the second apparatus.

According to an embodiment, the method comprises receiving, from the second apparatus, a response indicating termination of the connections over the forwarding interface.

According to an embodiment, the method comprises terminating the connections over the forwarding interface and stopping sending messages to the second apparatus.

According to an embodiment, the method comprises in response to detecting that ongoing message exchange over the forwarding interface has been completed or timed out, deleting handshake information from a memory, wherein the handshake information relates to a handshake operation performed over a control plane interface between the first and the second apparatus for setting up the connections over the forwarding interface.

According to an embodiment, the method comprises receiving a request from an operator to terminate connections over the forwarding interface between the first apparatus and the second apparatus.

According to an embodiment, the request to terminate connections over the forwarding interface is comprised in a security capability negotiation request transmitted over a control plane interface.

According to an embodiment, the request to terminate connections over the forwarding interface comprises information on identity of the first apparatus and is transmitted over a control plane interface.

According to an embodiment, the identity of the first apparatus is a fully quantified domain name.

According to a fourth aspect, there is provided a method comprising, in response to a selection of transport layer security as a security capability mechanism, receiving, by an apparatus configured to protect security of communication in roaming scenarios between a first network and a second network, the apparatus being a second apparatus residing in the second network, from a first apparatus residing in the first network and configured to protect security of communication in roaming scenarios between the first network and the second network, a request to terminate connections over a forwarding interface between the first apparatus and the second apparatus.

According to an embodiment, the request to terminate connections over the forwarding interface is comprised in a security capability negotiation request received over a control plane interface.

According to an embodiment, the request to terminate connections over a forwarding interface comprises information on identity of the first apparatus and is received over a control plane interface.

According to an embodiment, the method comprises transmitting, to the first apparatus, a response indicating termination of the connections over the forwarding interface.

According to an embodiment, the method comprises one or more of terminating the connections over the forwarding interface; stopping sending messages to the first apparatus; and discarding messages received from the first apparatus.

According to an embodiment, the response is comprised in a security capability negotiation response transmitted over a control plane interface.

According to an embodiment, the response comprises information on identity of the second apparatus.

According to an embodiment, the identity of the second apparatus is a fully quantified domain name.

According to an embodiment, the forwarding interface is a N32-f interface.

According to an embodiment, the first apparatus is an initiating security edge protection proxy and the second apparatus is a responding security edge protection proxy.

According to an embodiment, the means comprises at least one processor; and at least one memory including computer program code, the at least one memory and the computer program code configured to, with the at least one processor, cause the performance of the apparatus.

According to a fifth aspect, there is provided a computer readable medium comprising program instructions that, when executed by at least one processor, cause an apparatus to at least perform the method according to the third aspect and any of the embodiments thereof.

According to a sixth aspect, there is provided a computer readable medium comprising program instructions that, when executed by at least one processor, cause an apparatus to at least perform the method according to the fourth aspect and any of the embodiments thereof.

DETAILED DESCRIPTION

Figure 1:
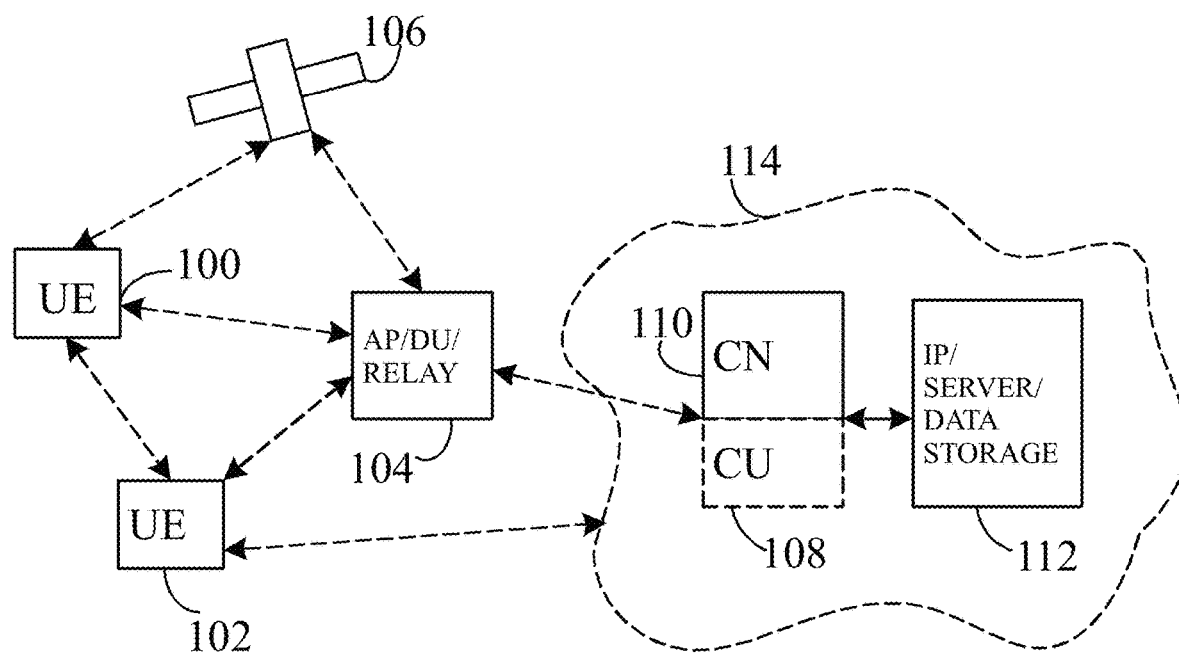
FIG. 1 shows, by way of example, a network architecture of communication system.

FIG. 1 shows, by way of an example, a network architecture of communication system. In the following, different exemplifying embodiments will be described using, as an example of an access architecture to which the embodiments may be applied, a radio access architecture based on long term evolution advanced (LTE Advanced, LTE-A) or new radio (NR), also known as fifth generation (5G), without restricting the embodiments to such an architecture, however. It is obvious for a person skilled in the art that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

The example of FIG. 1 shows a part of an exemplifying radio access network. FIG. 1 shows user devices 100 and 102 configured to be in a wireless connection on one or more communication channels in a cell with an access node, such as gNB, i.e. next generation NodeB, or eNB, i.e. evolved NodeB (eNodeB), 104 providing the cell. The physical link from a user device to the network node is called uplink (UL) or reverse link and the physical link from the network node to the user device is called downlink (DL) or forward link. It should be appreciated that network nodes or their functionalities may be implemented by using any node, host, server or access point etc. entity suitable for such a usage. A communications system typically comprises more than one network node in which case the network nodes may also be configured to communicate with one another over links, wired or wireless, designed for the purpose. These links may be used for signalling purposes. The network node is a computing device configured to control the radio resources of the communication system it is coupled to. The network node may also be referred to as a base station (BS), an access point or any other type of interfacing device including a relay station capable of operating in a wireless environment. The network node includes or is coupled to transceivers. From the transceivers of the network node, a connection is provided to an antenna unit that establishes bi-directional radio links to user devices. The antenna unit may comprise a plurality of antennas or antenna elements. The network node is further connected to core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc. An example of the network node configured to operate as a relay station is integrated access and backhaul node (IAB). The distributed unit (DU) part of the IAB node performs BS functionalities of the IAB node, while the backhaul connection is carried out by the mobile termination (MT) part of the IAB node. UE functionalities may be carried out by IAB MT, and BS functionalities may be carried out by IAB DU. Network architecture may comprise a parent node, i.e. IAB donor, which may have wired connection with the CN, and wireless connection with the IAB MT.

The user device, or user equipment UE, typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction.

Additionally, although the apparatuses have been depicted as single entities, different units, processors and/or memory units (not all shown in FIG. 1) may be implemented inside these apparatuses, to enable the functioning thereof.

5G enables using multiple input-multiple output (MIMO) technology at both UE and gNB side, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 7 Gigahertz (GHz), cmWave (cm=centimeter) and mmWave (mm=millimeter), and also being integratable with existing legacy radio access technologies, such as the LTE. Below 7 GHz frequency range may be called as FR1, and above 24 GHz (or more exactly 24-52.6 GHz) as FR2, respectively. Integration with the LTE may be implemented, at least in the early phase, as a system, where macro coverage is provided by the LTE and 5G radio interface access comes from small cells by aggregation to the LTE. In other words, 5G is planned to support both inter-Radio Access Technology (RAT) operability (such as LTE-5G) and inter-RI operability (inter-radio interface operability, such as below 7 GHz-cmWave, below 7 GHZ-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The communication system is also able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NVF) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 104) and non-real time functions being carried out in a centralized manner (in a centralized unit, CU 108).

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilise geostationary earth orbit (GEO) satellite systems, but also low earth orbit (LEO) satellite systems, in particular megaconstellations (systems in which hundreds of (nano)satellites are deployed). Each satellite 106 in the constellation may cover several satellite-enabled network entities that create on-ground cells. The on-ground cells may be created through an on-ground relay node 104 or by a gNB located on-ground or in a satellite.

Roaming refers to a user device, e.g. mobile phone, being used outside the range of the home network, which is the network for which the user or subscriber has contracted a subscription, and connecting to another network, that is, the visited network. The visited network refers to the network in which the subscriber roams temporarily while being outside the range of the home network. The home network may be referred to as a home public land mobile network (HPLMN) in which the subscriber's profile is held, and from which a visited network in which the user roams receives subscription information. The visited network may be referred to as a visited public land mobile network (VPLMN) upon which the subscriber has roamed when leaving one's HPLMN.

Security in roaming scenarios may be a serious concern for mobile network operators and their customers.

In 5G networks, for example, a security edge protection proxy (SEPP) is part of the roaming security architecture and works as a non-transparent proxy. One or more SEPPs are placed at the edge of a PLMN, e.g. of the HPLMN and of the VPLMN, and are configured to protect control plane messages. All service requests between the VPLMN and HPLMN are transmitted through the SEPPs. For service requests, the SEPP that resides in the PLMN where the service consumer network function (NF) is located may be referred to as the c-SEPP; the c-SEPP forwards the service request originated by the NF service consumer towards the remote PLMN. The SEPP that resides in the PLMN where the service producer NF is located may be referred to as the p-SEPP; the p-SEPP forwards the service request originated by the remote PLMN towards the NF service producer. For notification requests which are sent from an NF service producer to an NF service consumer, the c-SEPP (which forwards the notification request to the remote PLMN) is located in the PLMN where the NF service producer resides, and the p-SEPP (which receives the notification request originated by the remote PLMN) is located in the PLMN where the NF service consumer resides.

Figure 2:
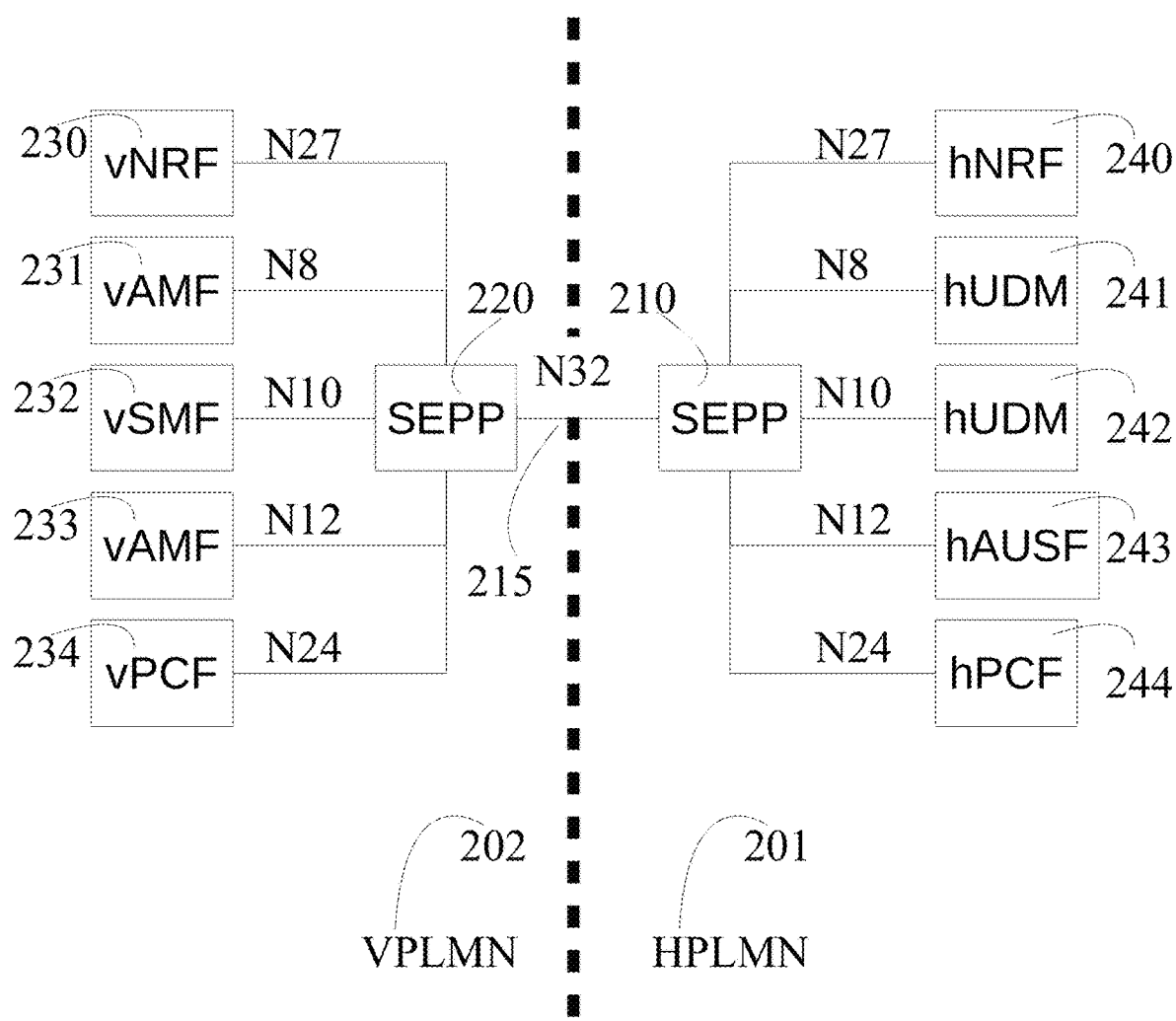
FIG. 2 shows, by way of example, communication between a first apparatus and a second apparatus configured to protect security of communication in roaming scenarios between a first network and a second network.

FIG. 2 shows, by way of example, communication between a first apparatus 210 and a second apparatus 220 configured to protect security of communication in roaming scenarios between a first network 201 and a second network 202. The first apparatus 210 may be a SEPP residing in the first network 201, e.g. in HPLMN. The second apparatus 220 may be a SEPP residing in the second network 202, e.g. in VPLMN. Communication interface 215 between the SEPPs 210, 220 of the VPLMN and HPLMN in roaming scenarios may be referred to as the N32 interface.

The VPLMN 202 may comprise a plurality of network functions (NFs) 230, 231, 232, 233, 234 that communicate with a local SEPP, that is, the SEPP 220 within the VPLMN 202. Correspondingly, the HPLMN 201 may comprise a plurality of NFs 240, 241, 242, 243, 244 that communicate with a local SEPP, that is, the SEPP 210 within the HPLMN 201. NFs may communicate with the local SEPP when issuing requests for communication interfaces, such as N27, N8, N10, N12 and N24. The local SEPP, i.e. the SEPP within the same PLMN as the NFs, may then communicate to peer NFs via the SEPP in the remote PLMN.

The N32 interface 215 comprises two separate interfaces, that is, N32-c interface and N32-f interface. N32-c interface is a control plane interface between the SEPPs 210, 220 for performing initial handshake and negotiating the security and protection policies and parameters to be applied for the hypertext transfer protocol (HTTP) request messages and response messages that are forwarded over the N32-f interface.

N32-f interface is a forwarding interface between the SEPPs 210, 220 used for forwarding HTTP request messages and response messages between service consuming NFs and service producing NFs. Messages exchanged over the N32-f interface may be protected according to the security and protection policies negotiated over N32-c interface.

When the security and protection policies are to be agreed between the SEPPs, an initiating SEPP shall initiate a security capability negotiation procedure towards a responding SEPP. The security capability negotiation procedure happens over N32-c interface between the SEPPs. Based on the negotiation procedure, a security mechanism is selected to be used for protecting NF service related signalling over N32-f.

For example, a selected security mechanism may be the protocol for N32 interconnect security (PRINS) which is an application layer security capability applied between two SEPPs using JWS (JavaScript Object Notation (JSON) Web Signature) and JWE (JSON Web Encryption).

As another example, a selected security mechanism may be the transport layer security (TLS) which makes use of N32-f hypertext transfer protocol secure (HTTPS) connections, or HTTP connections over a TLS tunnel, with security provided by TLS.

In the security capability negotiation procedure, the initiating SEPP transmits a request, e.g. HTTP POST request, towards the responding SEPP. The request comprises information elements carrying at least information on e.g. supported security capabilities (i.e. PRINS and/or TLS) and sender PLMN identity or identities (ID(s)).

If the request is processed successfully, the responding SEPP may respond to the initiating SEPP by transmitting a response, e.g. a POST response. The response comprises information elements carrying at least information on e.g. selected security capability and sender PLMN ID(s).

If processing of the request results in a failure, the responding SEPP may respond to the initiating SEPP with an appropriate status code.

The responding SEPP may compare the security capabilities supported by the initiating SEPP to its own supported security capabilities and/or with the security policies pre-agreed between the two network operators. Based on a local policy of the responding SEPP, and based on the comparison of the supported capabilities and/or a comparison of the security policies proposed by the initiating SEPP and the security policies pre-agreed between the two network operators, the responding SEPP may select a security mechanism that is supported by both SEPPs.

If the selected security mechanism is PRINS, the two SEPPs may maintain the HTTP connection for N32-c signalling, or release it and re-establish it later when new N32-c signalling needs to be exchanged, where each SEPP acts as a client towards the other SEPP which acts as a server. This connection may be used for later signalling of N32-f error reporting procedure and N32-f context termination procedure, for example.

If the selected security mechanism is TLS, HTTP request messages and response messages exchanged between the service consuming NFs and service producing NFs from different PLMNs are forwarded over N32-f HTTPS connections, or over HTTP connections over a TLS tunnel, between the SEPPs. Long-lived N32-f connections may be established between the SEPPs.

A situation may arise, wherein an operator may need to stop N32-f connectivity and message exchange between a pair of SEPPS, e.g. the initiating SEPP and the responding SEPP, or the c-SEPP and the p-SEPP. For example, the operator may wish to shut down a SEPP, or perform a task related to operations, administration and management (OAM), such as software upgrade. Overall, there may be various reasons for a need to terminate communication over N32-f interface.

If a local SEPP, e.g. c-SEPP, terminates its N32-f connections, including TLS connection, a remote SEPP, e.g. p-SEPP, may try to re-establish the N32-f connection towards c-SEPP for N32-f traffic forwarding. This is because the remote SEPP is not able to distinguish reasons behind the termination of the N32-f connections. In other words, the remote SEPP might have an impression that the N32-f connections have been terminated or torn down due to some transient error, for example. In response to noticing that the N32-f connections have been terminated, the remote SEPP keeps on trying to re-establish the connections. This causes unnecessary retries, failures which may be visible in logs and key performance indicators (KPIs), possibly delays to establish alternative N32-f connections towards alternative SEPPs and/or delays in redirecting N32-f traffic towards alternative N32-f connections, and/or unnecessary message routing from p-SEPP to c-SEPP.

There is provided a procedure for terminating N32-f connections between SEPPs, when the security capability negotiated between the SEPPs is TLS.

Figure 3A:
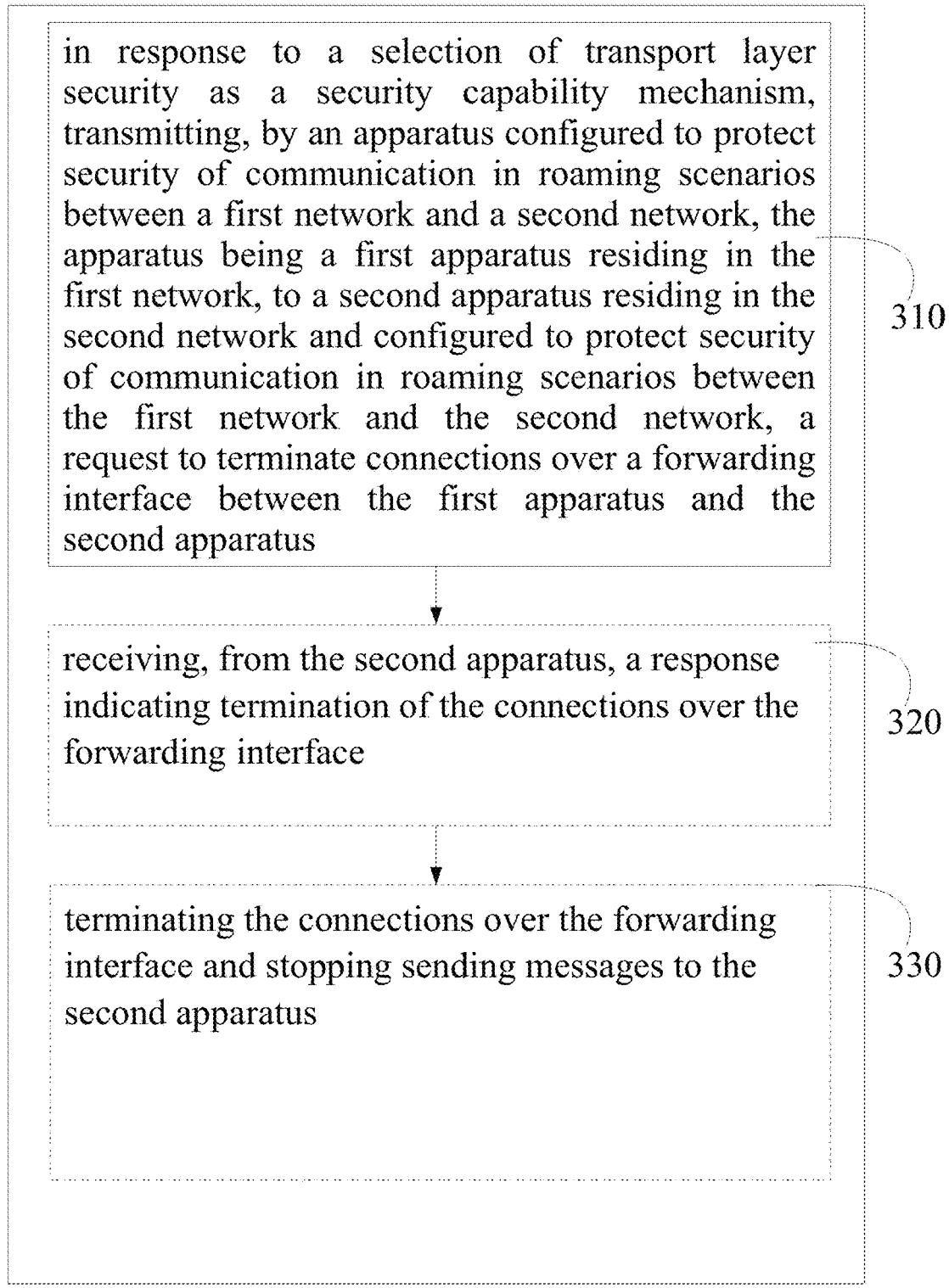
FIG. 3a shows, by way of example, a flowchart of a method.

FIG. 3a shows, by way of example, a flowchart of a method 300. The method 300 may be performed by a first apparatus, e.g. an initiating SEPP, such as a SEPP 410 of FIG. 4 or SEPP 610 of FIG. 6, or by a control device configured to control the functioning thereof, when installed therein. The method 300 comprises in response to a selection of transport layer security as a security capability mechanism, transmitting 310, by an apparatus configured to protect security of communication in roaming scenarios between a first network and a second network, the apparatus being a first apparatus residing in the first network, to a second apparatus residing in the second network and configured to protect security of communication in roaming scenarios between the first network and the second network, a request to terminate connections over a forwarding interface between the first apparatus and the second apparatus.

The boxes 320, 330 with dashed lines in the flowchart of FIG. 3a illustrate embodiments of the method 300. The method 300 may comprise receiving 320, from the second apparatus, a response indicating termination of the connections over the forwarding interface. The method 300 may comprise terminating 330 the connections over the forwarding interface and stopping sending messages to the second apparatus.

Figure 3B:
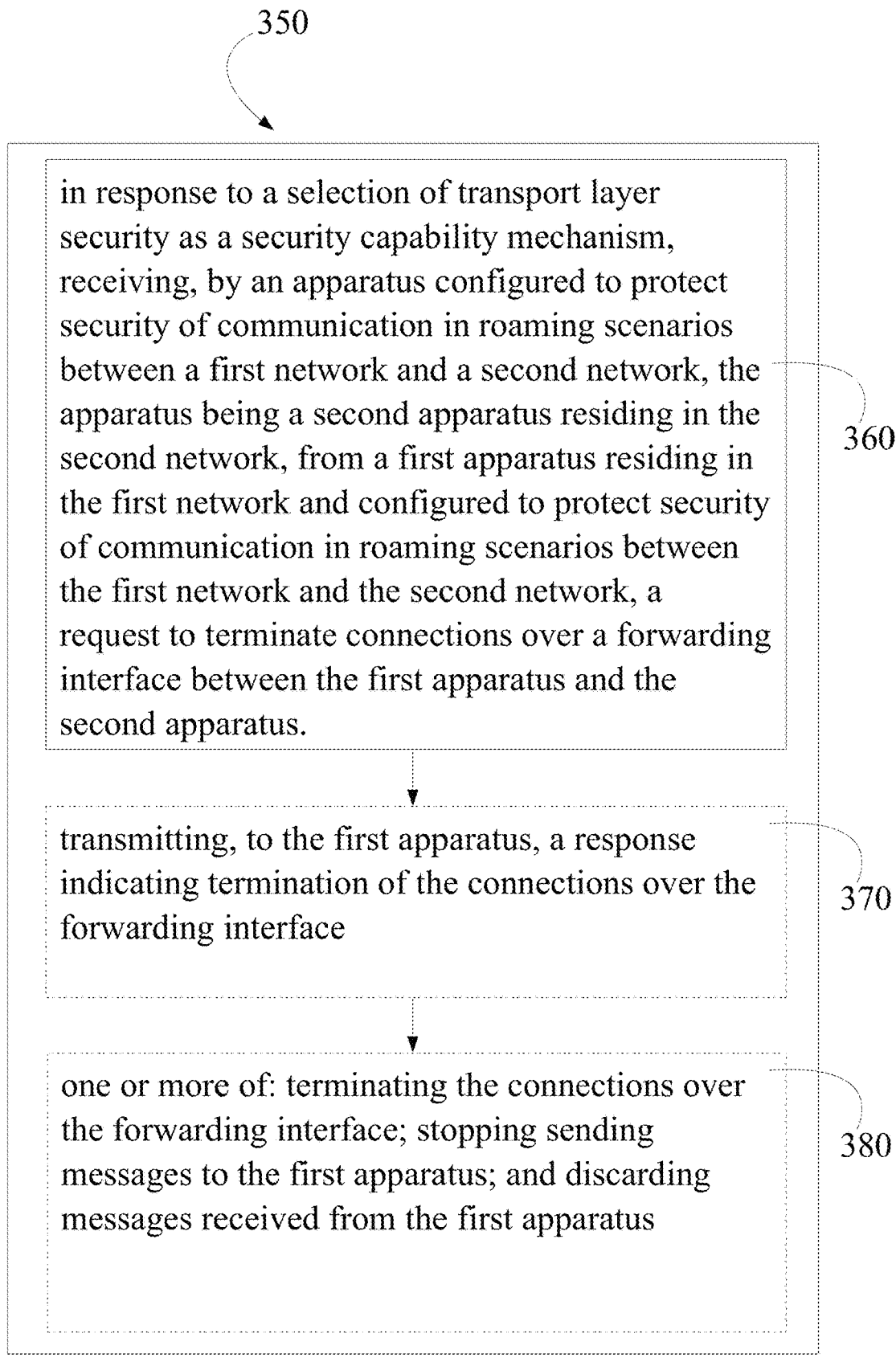
FIG. 3b shows, by way of example, a flowchart of a method.

FIG. 3b shows, by way of example, a flowchart of a method 350. The method 350 may be performed by a second apparatus, e.g. a responding SEPP, such as a SEPP 420 of FIG. 4 or SEPP 610 of FIG. 6, or by a control device configured to control the functioning thereof, when installed therein. The method 350 comprises in response to a selection of transport layer security as a security capability mechanism, receiving 360, by an apparatus configured to protect security of communication in roaming scenarios between a first network and a second network, the apparatus being a second apparatus residing in the second network, from a first apparatus residing in the first network and configured to protect security of communication in roaming scenarios between the first network and the second network, a request to terminate connections over a forwarding interface between the first apparatus and the second apparatus.

The boxes 370, 380 with dashed lines in the flowchart of FIG. 3b illustrate embodiments of the method 350. The method 350 may comprise transmitting 370, to the first apparatus, a response indicating termination of the connections over the forwarding interface. The method 350 may comprise one or more of 380 terminating the connections over the forwarding interface; stopping sending messages to the first apparatus; and discarding messages received from the first apparatus.

The methods disclosed herein enables communication of an indication or instruction to terminate connection(s) or communication over a forwarding interface, e.g. N32-f, between networks, when the negotiated security capability mechanism is TLS.

Communication of an indication or instruction to terminate N32-f connection may be realized by extending the existing N32-c security capability negotiation service operation or by defining an additional N32-c service operation.

Figure 4:
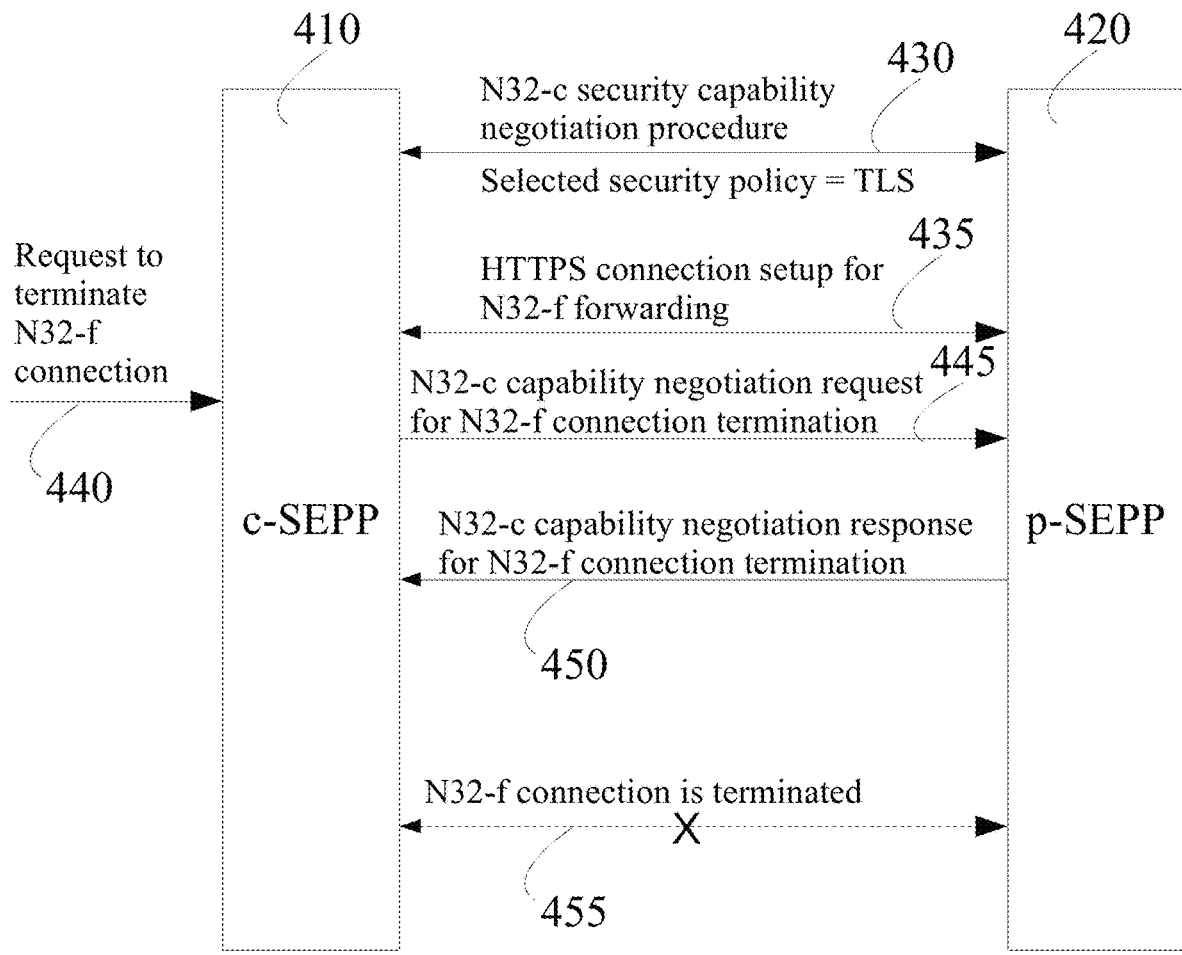
FIG. 4 shows, by way of example, signalling between a first apparatus and a second apparatus.

FIG. 4 shows, by way of example, signalling between a first apparatus 410 and a second apparatus 420. The first apparatus 410 may be a c-SEPP or an initiating SEPP. The second apparatus 420 may be a p-SEPP or a responding SEPP. Let us consider that TLS has been selected as a security policy as a result of security capability negotiation 430. The security capability negotiation procedure may have been performed during N32-c handshake. Then, one or more HTTPS connections, or HTTP connections over a TLS tunnel, are set up for N32-f forwarding 435, and N32-f messages may be exchanged over HTTPS connections, or HTTP connections over a TLS tunnel.

The c-SEPP 410 may receive a request 440 to terminate the N32-f connection. The request to terminate the N32-f connection may be received from an operator, for example. The request may indicate a graceful termination of the N32-f connection.

The N32-c security capability negotiation procedure may be extended such that it may be used to signal from the c-SEPP to the peer SEPP that N32-f connections shall be terminated between both SEPPs.

Thus, the initiating SEPP, e.g. the c-SEPP 410, may send a security capability negotiation request 445 to the responding SEPP, e.g. the p-SEPP 420. This request 445 may be a request to terminate connection(s) over a forwarding interface between the first apparatus 410 and the second apparatus 420. In other words, the request to terminate connection(s) over the forwarding interface between the SEPPs 410, 420 may be comprised in the security capability negotiation request that is transmitted over a control plane interface, i.e. N32-c.

The request 445 may comprise an indication of termination of N32-f connection. The indication of termination of N32-f connection indicates to the responding SEPP 420 that N32-f connections with the initiating SEPP 410 are to be terminated, e.g. must be terminated. In addition, any further incoming N32-f messages over the N32-f connections are to be discarded, e.g. must be discarded.

For example, the operation of sending a security capability negotiation request may be referred to as "Security Capability Negotiation for N32-f TLS connection termination if selected security policy is TLS". This operation may be used between the SEPPs to negotiate their security capabilities. A uniform resource identifier (URI) may be defined for the operation. For example, the HTTP method POST may be used on the URI {apiRoot}/n32c-handshake/v1/exchange-capability. Thus, the operation "Security Capability Negotiation for N32-f TLS connection termination if selected security policy is TLS" is the N32 capability exchange application programming interface (API) that may be used to gracefully terminate the N32f TLS connection if selected security policy is TLS.

Figure 5:
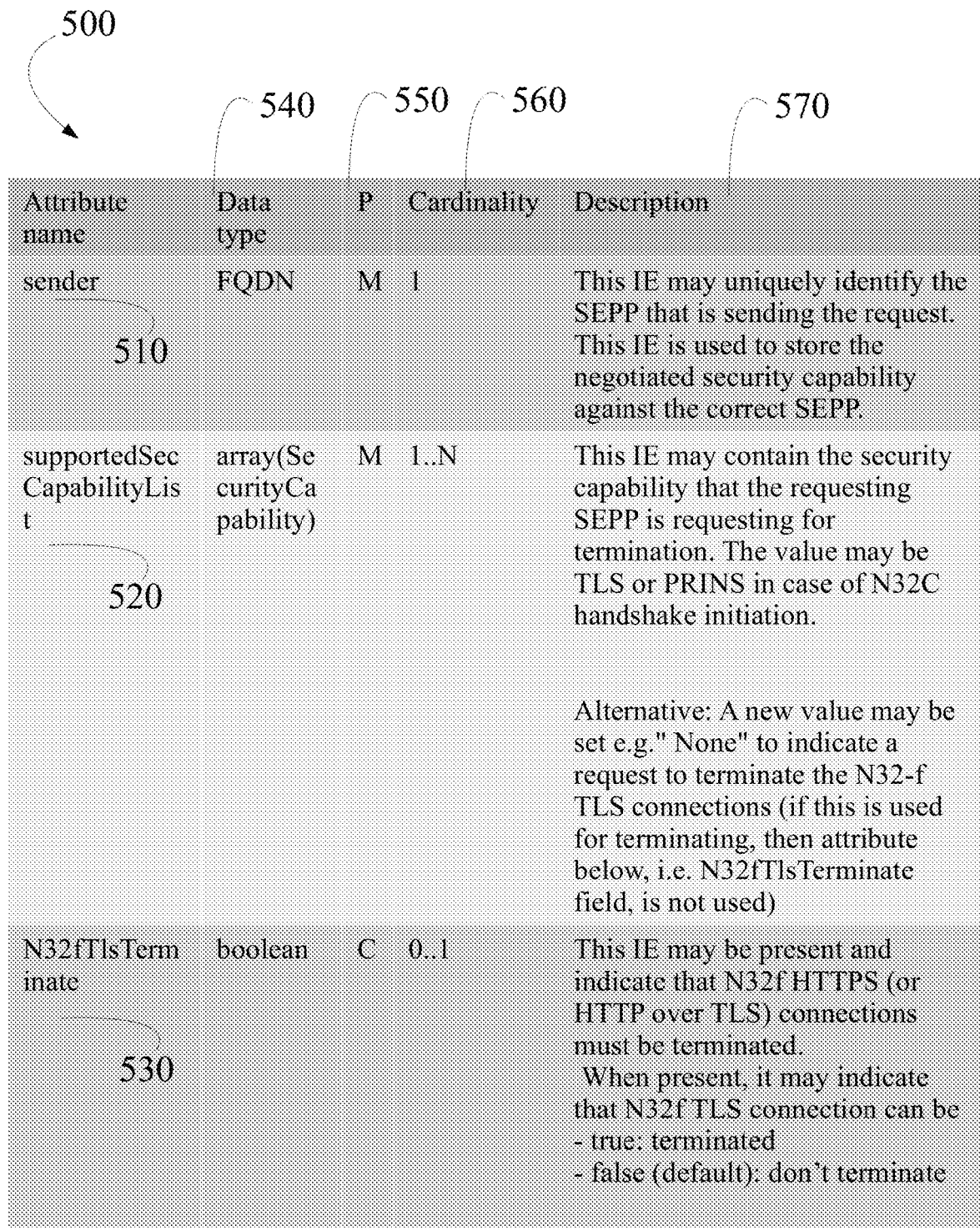
FIG. 5 shows, by way of example, a data structure of a security capability negotiation request.

FIG. 5 shows, by way of example, a data structure 500 of a security capability negotiation request. The request may be of a type SecNegotiateReqData, for example. The data structure may comprise attributes or information elements (IEs), such as:

- A "sender" 510 that indicates an identity of the sender, e.g. fully quantified domain name (FQDN). This IE uniquely identifies the SEPP that is sending the request. This IE is used to store the negotiated security capability against the correct SEPP.
- A list of supported security capabilities "supportedSecCapabilityList" 520 that indicates supported security capabilities. This IE may comprise the security capability that the requesting SEPP is requesting for termination by the responding SEPP. The value of the attribute may be TLS or PRINS, in case of N32-c handshake initiation.
   Alternatively, the value of the IE 520 may be set to indicate a request to terminate the N32-f connections. For example, the value may be set to "None". If this is used to indicate the request to terminate the N32-f, the field below, i.e. the IE 530, might not be used.
   To summarize, possible values for security capabilities, i.e. the IE 520, comprise, for example, "TLS" as TLS security, "PRINS" as protocol for N32 interconnect security, and "None" as N32-f connections termination. Instead of "None", the value may be any suitable indication or instruction to terminate N32-f connections.
- Indication to terminate N32-f connections "N32fTlsTerminate" 530 that indicates that the N32-f connections are to be terminated. That is, HTTPS connections, or HTTP connections over TLS tunnel, are to be terminated. For example, this attribute may be defined as a Boolean and its value may be e.g. "true" or "false", wherein "true" may indicate that N32-f connection shall be terminated, and wherein "false" may indicate that N32-f connection shall not be terminated. This field might not be used if the indication to terminate N32-f connections is included in the field above, i.e. the attribute 520, using an additional value, e.g. "None" for the attribute of a list of supported security capabilities.

For example, the IE 520 may be TLS, and the IE 530 may be "true".

As another example, the IE 520 may be "None", and the data structure 500 may be without the IE 530.

The request may comprise at least part of the above IEs. The request may additionally comprise other IEs as well. The data structure may further define data type 540 of the IE, condition of presence, P, 550 of the IE, cardinality 560 for the IE, and/or the description 570. Condition for presence 550 may be mandatory (M), optional (O), or conditional (C), for example.

Referring back to FIG. 4, the responding SEPP 420, e.g. p-SEPP, may send a response 450 to the initiating SEPP 410, e.g. c-SEPP. The response may indicate termination of the N32-f connection(s), that is, whether the N32-f connection (s) has or have been terminated. The response 450 indicating termination of the N32-f connection(s) may be comprised in a security capability negotiation response. The response may be transmitted over a control plane interface.

Regarding a data structure of a security capability negotiation response, it may comprise corresponding IEs as the data structure of the request shown in FIG. 5. The "sender" attribute identifies the SEPP that is sending the response. A list of selected security capabilities "selectedSecCapability" indicates the security capability that the requesting SEPP is requesting for termination by the responding SEPP. The "N32fTlsTerminate" IE may indicate whether N32-f connection(s) has or have been terminated.

The response may comprise at least part of the corresponding IEs as the request. The response may additionally comprise other IEs as well.

Figure 6:
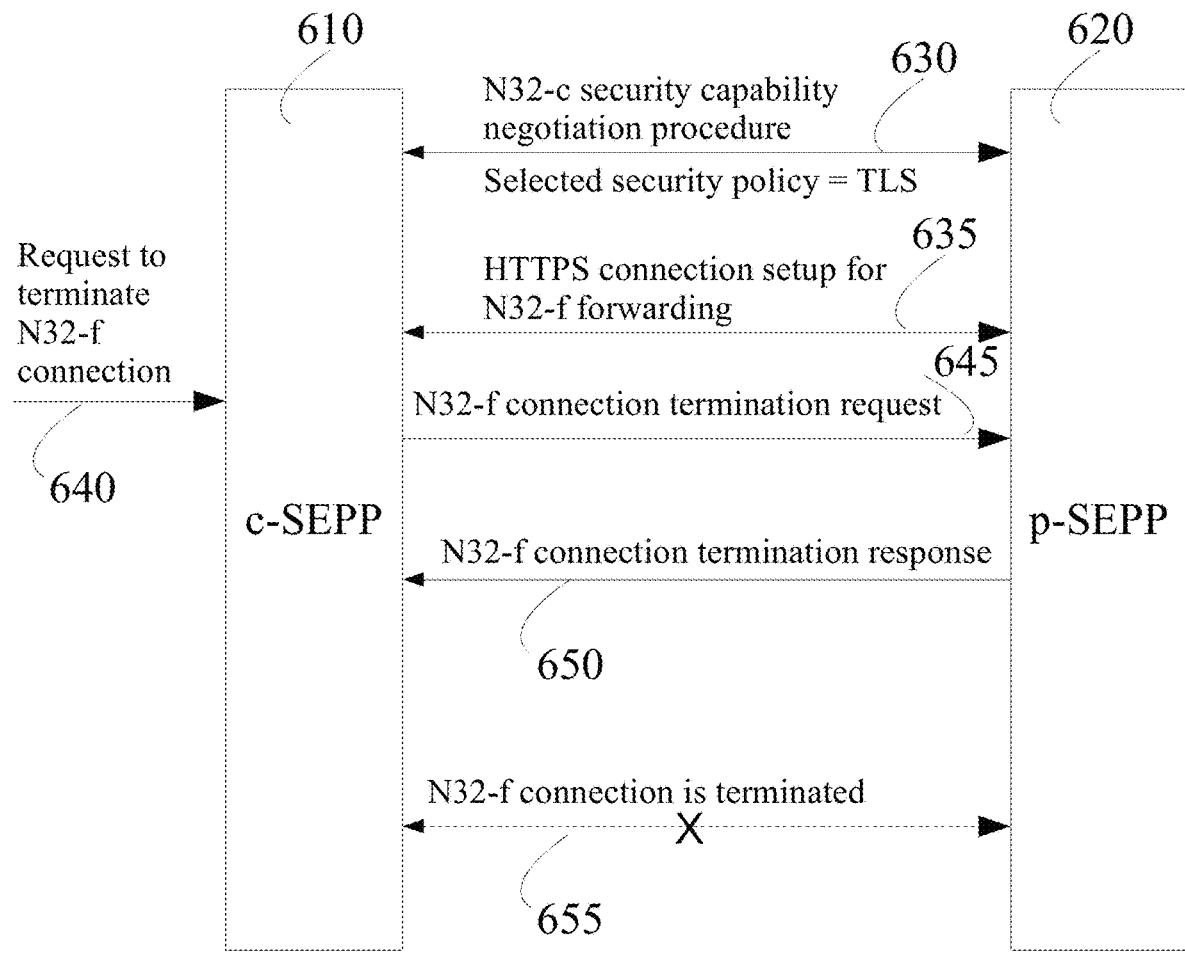
FIG. 6 shows, by way of example, signalling between a first apparatus and a second apparatus.

Alternatively, the request to terminate connection(s) over the forwarding interface between the first apparatus and the second apparatus, or communication of an indication or instruction to terminate N32-f connection, may be realized by defining an additional N32-c service operation. FIG. 6 shows, by way of example, signalling between a first apparatus 610 and a second apparatus 620. The first apparatus 610 may be a c-SEPP or an initiating SEPP. The second apparatus 620 may be a p-SEPP or a receiving SEPP. Let us consider that TLS has been selected as a security policy as a result of security capability negotiation 630. The security capability negotiation procedure may have been performed during N32-c handshake. Then, HTTPS connections, or HTTP connections over a TLS tunnel, are set up for N32-f forwarding 635, and N32-f messages may be exchanged over HTTPS connections, or HTTP connections over a TLS tunnel.

The c-SEPP may receive a request 640 to terminate the N32-f connection. The request to terminate the N32-f connection may be received from an operator, for example. The request may indicate a graceful termination of the N32-f connection.

The SEPP, e.g. c-SEPP 610, may send to the peer SEPP, e.g. p-SEPP 620, its own identity during the N32-c handshake. The identity may be e.g. the fully quantified domain name (FQDN), i.e. sender FQDN. The identity of the initiating SEPP 610, e.g. the sender FQDN, may be used to indicate and/or initiate the termination of N32-f connections. The initiating SEPP 610 may initiate the N32-f termination procedure by transmitting a request 645 to the responding SEPP 620, the request comprising an indication or instruction to terminate connection(s) over the forwarding interface, that is, to terminate the N32-f connection. The request may be transmitted over a control plane interface, i.e. N32-c.

For example, the operation of sending a request to terminate connection(s) over the forwarding interface, or a request comprising an indication of termination of N32-f connection, may be referred to as "N32-f TLS Terminate". A URI may be defined for the operation. For example, the initiating SEPP may use the HTTP method POST on the URI: {apiRoot}/n32c-handshake/v1/n32f-terminate-tls. Thus, the operation "N32-f TLS Terminate" is the N32-f TLS termination procedure API.

Figure 7A:
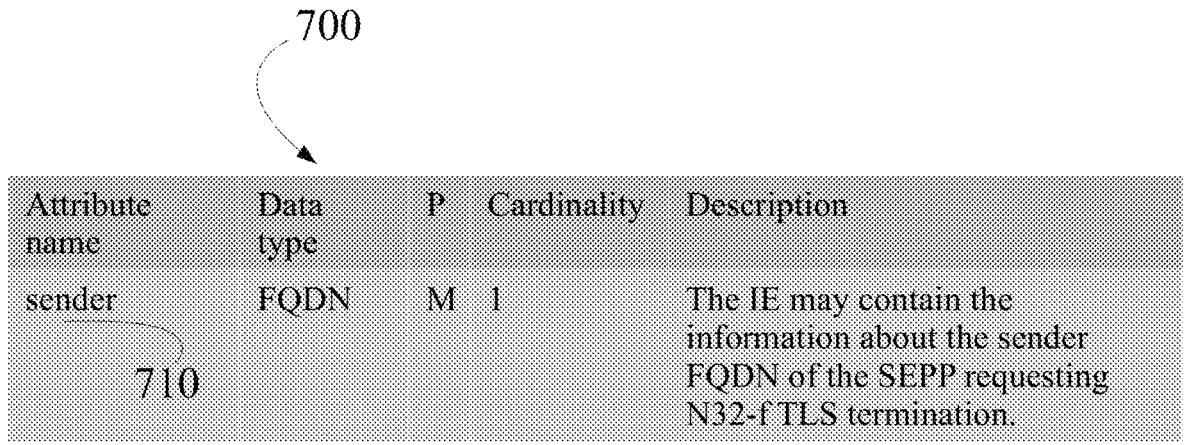
FIG. 7a shows, by way of example, a data structure of a request to terminate connection(s) over a forwarding interface.

FIG. 7a shows, by way of example, a data structure 700 of a request to terminate connection(s) over the forwarding interface. The request may comprise an indication of termination of N32-f connection. The data structure may comprise IE(s), such as a "sender" attribute 710. This IE comprises information on the sender identity, e.g. FQDN. In other words, the request comprises information about the SEPP that requests termination of the N32-f connection. Information on the sender identity, e.g. FQDN, may be used to initiate the termination of the N32-f connection(s).

The request may additionally comprise other IEs as well.

Referring back to FIG. 6, the responding SEPP 620, e.g. p-SEPP, may send a response 650 to the initiating SEPP 610, e.g. c-SEPP. The response may indicate termination of the N32-f connection(s), that is, whether the N32-f connection (s) has or have been terminated.

Figure 7B:
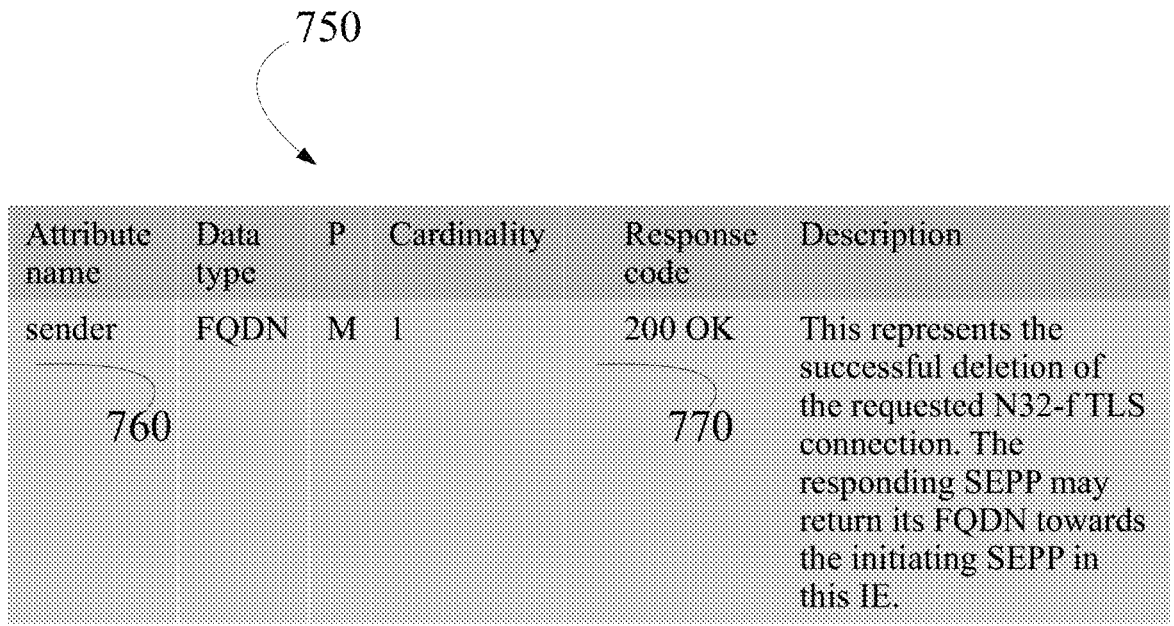
FIG. 7b shows, by way of example, a data structure of a response sent from a second apparatus to a first apparatus.

FIG. 7b shows, by way of example, a data structure 750 of a response sent from a second apparatus to a first apparatus, that is, from the responding SEPP 620, e.g. p-SEPP, to the initiating SEPP 610, e.g. c-SEPP. The "sender" IE 760 may represent successful deletion of the N32-f connection. Response sent from the p-SEPP to the c-SEPP after successful processing of the request may comprise a status code 770, e.g. "200 OK", indicating that the process has been successful. The responding SEPP may return its identity, e.g. FQDN, towards the initiating SEPP in this IE.

Referring back to FIG. 4 and FIG. 6, if the request 445, 645 to terminate the N32-f connection(s) is processed successfully, the responding SEPP 420, 620 may tear down N32-f connections with the initiating SEPP 410, 610, and stop sending any further messages over the N32-f towards the initiating SEPP. In addition, the responding SEPP 420, 620 may discard any incoming N32-f message from the initiating SEPP 410, 610.

Upon receipt of the peer SEPP's response 450, 650, the initiating SEPP 410, 610 may tear down N32-f connections towards the responding SEPP. In addition, the initiating SEPP 410, 610 may stop sending any further messages over the N32-f towards the responding SEPP 420, 620.

If there are ongoing N32-f message exchanges between the initiating SEPP 410, 610 and the responding SEPP 420, 620, the initiating SEPP 410, 610 may wait those to be completed or timed out. Once the ongoing N32-f message exchanges are completed or timed out, the N32-c handshake information may be deleted from memory of the initiating SEPP 410, 610, if that kind of information has been stored in the memory.

Situation wherein the N32-f connection(s) has or have been terminated, has been illustrated in FIG. 4 and FIG. 6 by arrows 455 and 655.

If processing of the request 445, 645 results in a failure, the responding SEPP may respond to the initiating SEPP with an appropriate status code. In addition, details regarding the failure may be reported, e.g. with the "ProblemDetails" JSON body.

Figure 8:
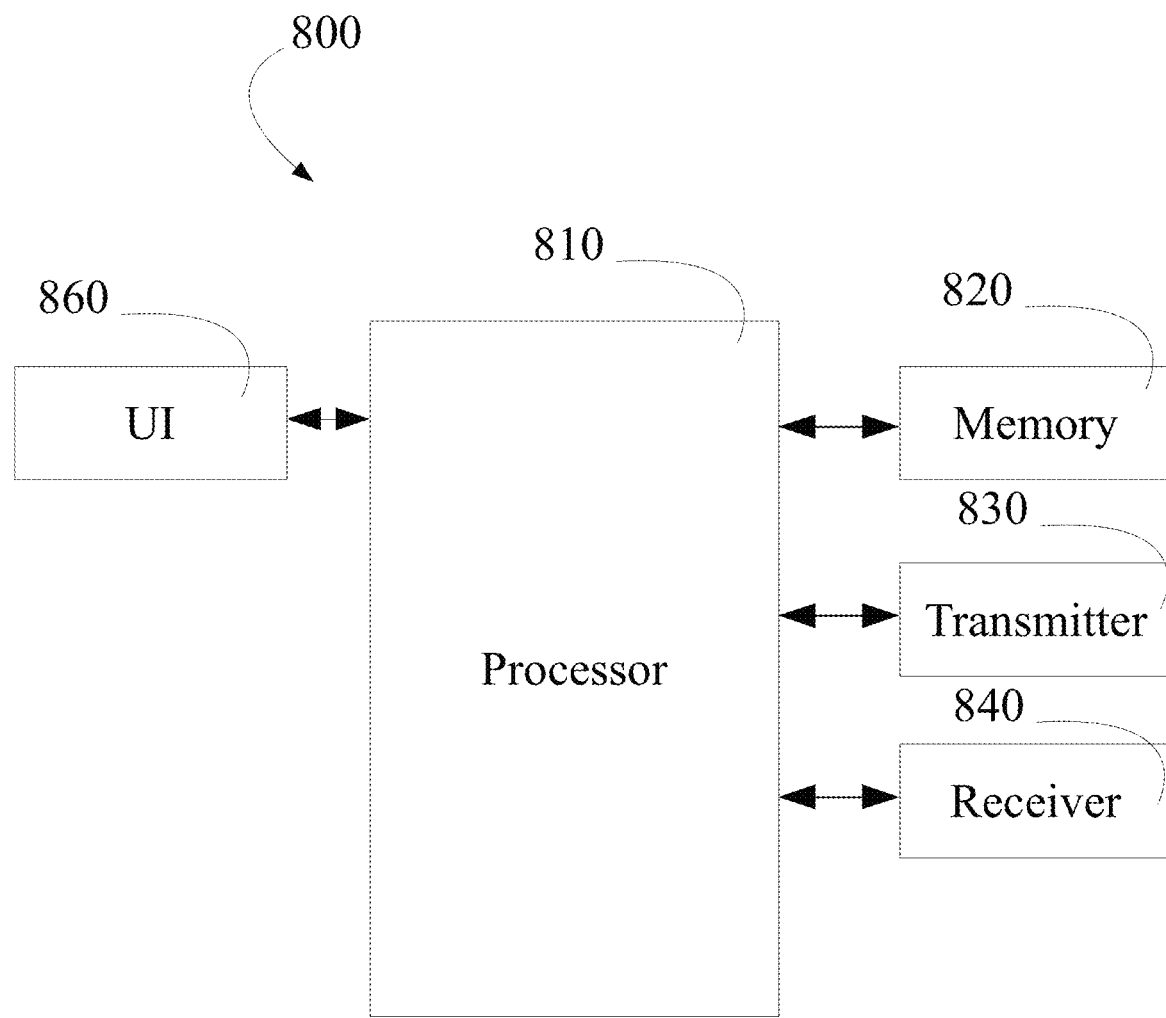
FIG. 8 shows, by way of example, a block diagram of an apparatus.

FIG. 8 shows, by way of example, a block diagram of an apparatus capable of performing the method(s) as disclosed herein. The apparatus 800 may be configured to protect security of communication in roaming scenarios between a home network and a visited network. The apparatus or device 800 may comprise, for example, a security edge protection proxy (SEPP), such as the SEPP 210 or SEPP 220 of FIG. 2, or SEPP 410 or SEPP 420 of FIG. 4, or SEPP 610 or SEPP 620 of FIG. 6. Comprised in device 800 is processor 810, which may comprise, for example, a single- or multi-core processor wherein a single-core processor comprises one processing core and a multi-core processor comprises more than one processing core. Processor 810 may comprise, in general, a control device. Processor 810 may comprise more than one processor. Processor 810 may be a control device. A processing core may comprise, for example, a Cortex-A8 processing core manufactured by ARM Holdings or a Steamroller processing core designed by Advanced Micro Devices Corporation. Processor 810 may comprise at least one Qualcomm Snapdragon and/or Intel Atom processor. Processor 810 may comprise at least one application-specific integrated circuit, ASIC. Processor 810 may comprise at least one field-programmable gate array, FPGA. Processor 810 may be means for performing method steps in device 800. Processor 810 may be configured, at least in part by computer instructions, to perform actions.

A processor may comprise circuitry, or be constituted as circuitry or circuitries, the circuitry or circuitries being configured to perform phases of methods in accordance with example embodiments described herein. As used in this application, the term "circuitry" may refer to one or more or all of the following: (a) hardware-only circuit implementations, such as implementations in only analog and/or digital circuitry, and (b) combinations of hardware circuits and software, such as, as applicable: (i) a combination of analog and/or digital hardware circuit(s) with software/firmware and (ii) any portions of hardware processor(s) with software (including digital signal processor(s)), software, and memory(ies) that work together to cause an apparatus, such as a SEPP, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Device 800 may comprise memory 820. Memory 820 may comprise random-access memory (RAM) and/or permanent memory. Memory 820 may comprise at least one RAM chip. Memory 820 may comprise solid-state, magnetic, optical and/or holographic memory, for example. Memory 820 may be at least in part accessible to processor 810. Memory 820 may be at least in part comprised in processor 810. Memory 820 may be means for storing information. Memory 820 may comprise computer instructions that processor 810 is configured to execute. When computer instructions configured to cause processor 810 to perform certain actions are stored in memory 820, and device 800 overall is configured to run under the direction of processor 810 using computer instructions from memory 820, processor 810 and/or its at least one processing core may be considered to be configured to perform said certain actions. Memory 820 may be at least in part external to device 800 but accessible to device 800.

Device 800 may comprise a transmitter 830. Device 800 may comprise a receiver 840. Transmitter 830 and receiver 840 may be configured to transmit and receive, respectively, information in accordance with at least one cellular or non-cellular standard. Transmitter 830 may comprise more than one transmitter. Receiver 840 may comprise more than one receiver. Transmitter 830 and/or receiver 840 may be configured to operate in accordance with global system for mobile communication, GSM, wideband code division multiple access, WCDMA, 5G, long term evolution, LTE, Interim Standard 95 (IS-95), wireless local area network, WLAN, Ethernet and/or worldwide interoperability for microwave access, WiMAX, standards, for example.

Device 800 may comprise user interface, UI, 860. UI 860 may comprise at least one of a display, a keyboard, a touchscreen, and a mouse, for example. A user may be able to operate device 800 via UI 860, for example to manage digital files stored in memory 820 or on a cloud accessible via transmitter 830 and receiver 840.

Processor 810 may be furnished with a transmitter arranged to output information from processor 810, via electrical leads internal to device 800, to other devices comprised in device 800. Such a transmitter may comprise a serial bus transmitter arranged to, for example, output information via at least one electrical lead to memory 820 for storage therein. Alternatively to a serial bus, the transmitter may comprise a parallel bus transmitter. Likewise processor 810 may comprise a receiver arranged to receive information in processor 810, via electrical leads internal to device 800, from other devices comprised in device 800. Such a receiver may comprise a serial bus receiver arranged to, for example, receive information via at least one electrical lead from receiver 840 for processing in processor 810. Alternatively to a serial bus, the receiver may comprise a parallel bus receiver.

The invention claimed is:

1. An apparatus configured to protect security of communication in roaming scenarios between a first network and a second network, the apparatus being a first apparatus residing in the first network and comprising:
   at least one processor; and
   at least one memory including computer program code, the at least one memory and the computer program code configured to, with the at least one processor, cause the first apparatus to:
   initiate a security capability negotiation procedure towards a second apparatus residing in the second network over a control plane interface to select transport layer security as a security mechanism for a forwarding interface between the first apparatus and the second apparatus; and
   send, when terminating a connection over the forwarding interface with transport layer security selected as the security mechanism, a security capability negotiation request of the security capability negotiation procedure to the second apparatus over the control plane interface to terminate the connection over the forwarding interface.

2. The apparatus of claim 1, wherein the at least one memory and computer program code are further configured to, with the at least one processor, cause the first apparatus to:
   receive, from the second apparatus, a security capability negotiation response indicating termination of the connection over the forwarding interface.

3. The apparatus of claim 2, wherein the at least one memory and computer program code are further configured to, with the at least one processor, cause the first apparatus to:
   terminate the connection over the forwarding interface, and stop sending messages to the second apparatus.

4. The apparatus of claim 2, wherein the at least one memory and computer program code are further configured to, with the at least one processor, cause the first apparatus to:

in response to detecting that ongoing message exchange over the forwarding interface has been completed or timed out, delete handshake information from the at least one memory, wherein the handshake information relates to a handshake operation performed over the control plane interface.

5. The apparatus of claim 1, wherein the at least one memory and computer program code are further configured to, with the at least one processor, cause the first apparatus to:
receive a prior request from an operator to terminate the connection over the forwarding interface.

6. The apparatus of claim 1, wherein:
the security capability negotiation request includes an information element to indicate security capabilities supported by the first apparatus; and
the at least one memory and computer program code are further configured to, with the at least one processor, cause the first apparatus to:
set the information element to a value instructing termination of the connection over the forwarding interface.

7. The apparatus of claim 6, wherein the value is "none".

8. The apparatus of claim 1, wherein the security capability negotiation request comprises information on an identity of the first apparatus.

9. The apparatus of claim 1, wherein:
the control plane interface is a N32-c interface; and
the forwarding interface is a N32-f interface.

10. The apparatus of claim 1, wherein the first apparatus is an initiating security edge protection proxy and the second apparatus is a responding security edge protection proxy.

11. An apparatus configured to protect security of communication in roaming scenarios between a first network and a second network, the apparatus being a second apparatus residing in the second network and comprising:
at least one processor; and
at least one memory including computer program code, the at least one memory and the computer program code configured to, with the at least one processor, cause the second apparatus to:
perform a security capability negotiation procedure with a first apparatus residing in the first network over a control plane interface to select transport layer security as a security mechanism for a forwarding interface between the first apparatus and the second apparatus; and
receive, when terminating a connection over the forwarding interface with transport layer security selected as the security mechanism, a security capability negotiation request of the security capability negotiation procedure from the first apparatus over the control plane interface to terminate the connection over the forwarding interface.

12. The apparatus of claim 11, wherein:
the security capability negotiation request includes an information element to indicate security capabilities supported by the first apparatus, and the information element is set to a value instructing termination of the connection over the forwarding interface.

13. The apparatus of claim 12, wherein the value is "none".

14. The apparatus of claim 11, wherein the security capability negotiation request comprises information on an identity of the first apparatus.

15. The apparatus of claim 11, wherein the at least one memory and computer program code are further configured to, with the at least one processor, cause the second apparatus to:
transmit, to the first apparatus, a security capability negotiation response indicating termination of the connection over the forwarding interface.

16. The apparatus of claim 15, wherein the at least one memory and computer program code are further configured to, with the at least one processor, cause the second apparatus to perform one or more of:
terminating the connection over the forwarding interface;
stopping sending messages to the first apparatus; and
discarding messages received from the first apparatus.

17. The apparatus of claim 15, wherein:
the security capability negotiation response includes an information element to indicate security capabilities supported by the second apparatus, and the information element is set to a value indicating termination of the connections over the forwarding interface.

18. The apparatus of claim 15, wherein the security capability negotiation response comprises information on an identity of the second apparatus.

19. A method of security of communication in roaming scenarios between a first network and a second network, the method comprising:
initiating, at a first apparatus residing in the first network, a security capability negotiation procedure towards a second apparatus residing in the second network over a control plane interface to select transport layer security as a security mechanism for a forwarding interface between the first apparatus and the second apparatus; and
sending, when terminating a connection over the forwarding interface with transport layer security selected as the security mechanism, a security capability negotiation request of the security capability negotiation procedure from the first apparatus to the second apparatus over the control plane interface to terminate the connection over the forwarding interface.

20. The method of claim 19, wherein:
the security capability negotiation request includes an information element to indicate security capabilities supported by the first apparatus; and
the method further comprises:
setting, at the first apparatus, the information element to a value instructing termination of the connection over the forwarding interface.

* * * * *